E. F. BURROWS.
Car Brake.

No. 35,078.

Patented Apr. 29, 1862.

Witnesses:

Inventor:
Edmund F. Burrows

UNITED STATES PATENT OFFICE.

EDMUND F. BURROWS, OF MYSTIC RIVER, CONNECTICUT.

IMPROVED SELF-ACTING BRAKE FOR RAILROADS.

Specification forming part of Letters Patent No. 35,078, dated April 29, 1862.

*To all whom it may concern:*

Be it known that I, EDMUND F. BURROWS, of Mystic River, in the county of New London and State of Connecticut, have invented a new and Improved Self-Acting Brake designed more especially for Horse Railroad-Cars; and I do hereby declare that the following is a full, clear, and exact description of the same, reference being had to the accompanying drawings, making a part of this specification, in which—

Figure 1:
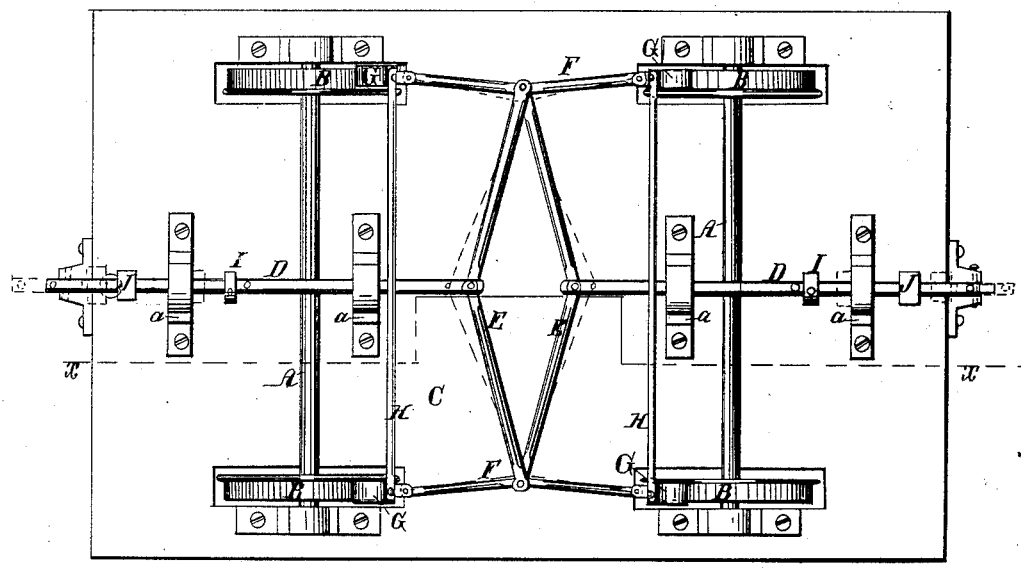
Figure 2:
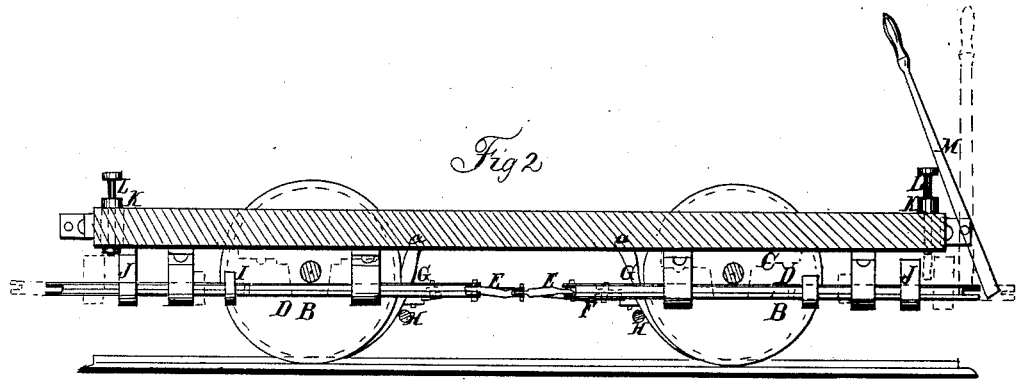

Figure 1 is an inverted plan of a railroad-car with my invention applied to it; Fig. 2, a side sectional view of the same, taken in the line $x\ x$, Fig. 1.

Similar letters of reference indicate corresponding parts in the two figures.

The object of this invention is to obtain a brake for horse railroad-cars and other wheel-vehicles, which will be self-acting and at the same time admit of being operated at the will of the driver like the ordinary hand-brakes in use.

To this end the invention consists in the employment or use of toggles connected with shoes and with the draft-pole, and arranged with stops and levers in a manner hereinafter described.

To enable those skilled in the art to fully understand and construct my invention, I will proceed to describe it.

A A represent the axles of a horse railroad-car. B are the wheels, and C the bottom or bed of the car. These parts may be constructed in the usual way, and therefore do not require a minute description.

D D represent two rods, which are fitted in bearings $a$, attached to the under side of the bed C. These rods have a central position underneath the car-bed, and they are attached at their back ends to toggles E E, the outer ends of which are connected together and to the joints of toggles F F, which are between the two pairs of wheels of the car. The arrangement of the toggles is shown clearly in Fig. 1. By referring to this figure it will be seen that the toggles F F are connected to shoes G, the upper ends of which are connected by pivots $a$ to the car-bed, and the shoes G G of each pair of wheels are connected by a bar, H, as shown in Fig. 1. On each rod D there is secured a collar, I, and an upright projection, J, the latter being at the outer sides of the front bearings, $a$, and the collars I behind them. At each end of the car-bed there is attached a vertical tube or socket, K, in which a pin, L, is placed, having a spiral spring around it, which springs have a tendency to keep the pins L elevated, so that their lower ends will be above or "flush" with the lower surface of the car-bed, and to each end of the car-bed there is attached a lever, M, (see Fig. 2,) in which a lever, M, is shown at one end of the car-bed.

The operation is as follows: The draft-pole is attached to the outer end of one of the rods D, and said rod under the pull of the animals is drawn out as far as the collar I upon it will admit, said collar bearing against the outer bearing, $a$. The shoes G under the pull of the animals will be kept free from the treads of the wheels B, as will be seen by referring to Fig. 1, the red lines showing the position of the toggles when the shoes are off from the wheels. When the car passes down a descending grade and the speed of the horses checked, the momentum of the car will operate or move the toggles E E, so that the joints at their centers will approach each other, and the joints of the toggles F F will be moved outward, and the shoes G pressed against the treads of the wheels, as shown in tint in Fig. 1. Thus it will be seen that the brake is self-acting.

In case the driver desires to back the car he pushes down the pin L in front of him with his foot, so that the lower end of said pin will be behind the projection J, as shown in red in Fig. 2, and the rod D will be thereby prevented from being shoved back and the shoes G kept free from the wheels, and in case the driver desires to operate or put on the brake when the car is moving on level ground he operates the lever M, shoving its upper end forward, and thereby causing its lower end to act against the projection J and shove the rod D backward. The brake, therefore, may be operated at the will of the driver whenever necessary, and be equally as effective as the ordinary hand-brake.

The draft-pole may be attached to the outer end of either rod D, according to the direction in which the car is to be drawn.

Having thus described my invention, what I claim as new, and desire to secure by Letters Patent, is—

1. The combination of the toggles E E F F, shoes G, and rods D, provided with the collars or stops I, all being arranged and applied to the car or other vehicle, substantially as and for the purpose herein set forth.

2. The projections J, attached to the rods D, in combination with the pins L, for the purpose specified.

3. The levers M, when used in connection with the rods D D, and provided with the projections J, the toggles E E F F, and shoes G, all combined and arranged as and for the purpose set forth.

EDMUND F. BURROWS.

Witnesses:
JAMES LAIRD,
R. GAWLETT.